United States Patent Office 2,713,511
Patented July 19, 1955

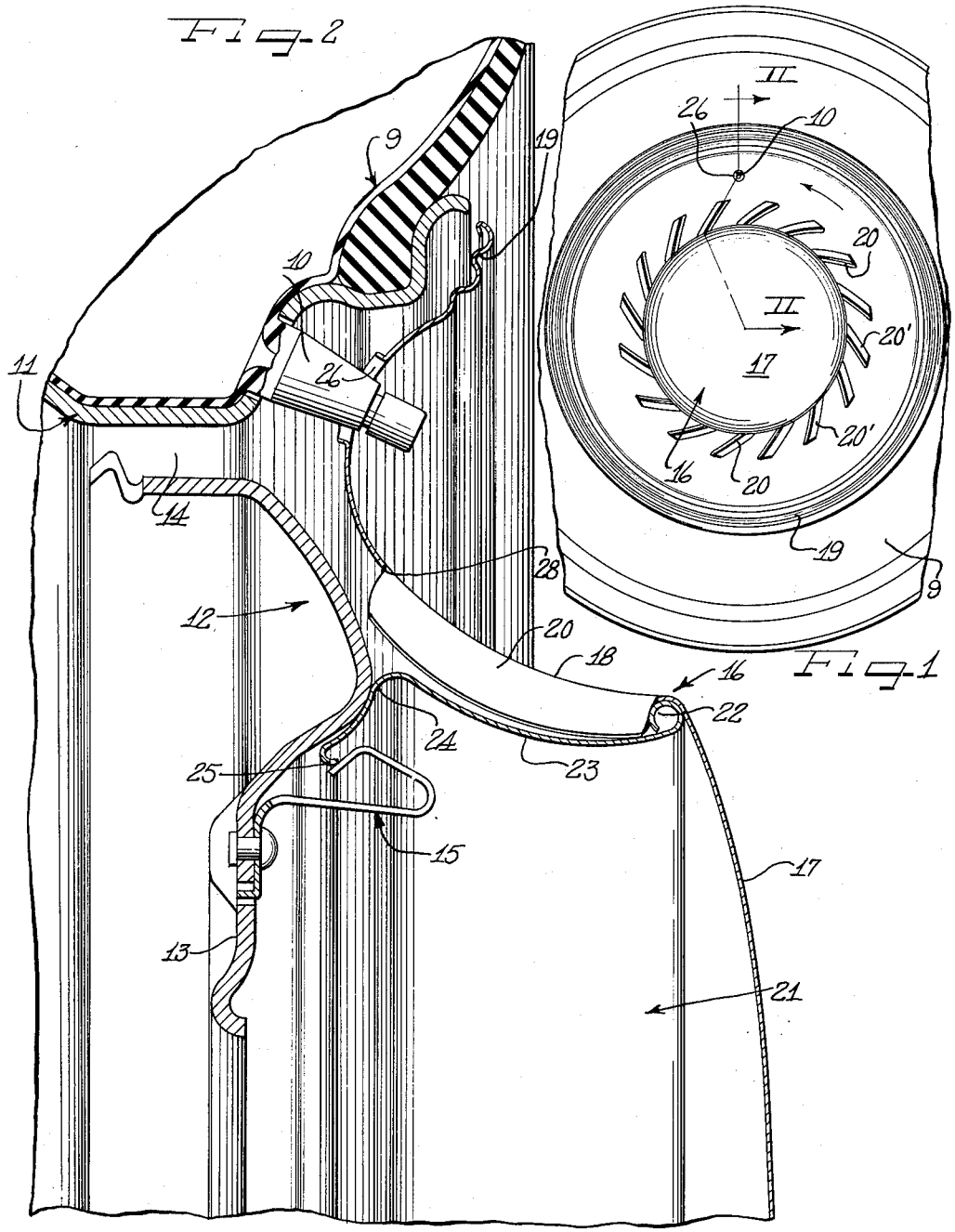

2,713,511

WHEEL COVER

George Albert Lyon, Detroit, Mich.

Application December 5, 1951, Serial No. 259,922

10 Claims. (Cl. 301—37)

This invention relates to automobile wheel structures and more particularly to a combination wheel cover and air-circulating device.

At the present time, due to changes made in brake structures of automobile wheels, automotive engineers have been confronted with the need of providing on the wheel means such as vanes and the like for circulating air through the wheel to assist in cooling the brake drum. Some engineers have provided a fin structure on the brake drum whereas others have provided auxiliary vaned devices.

I propose, in accordance with the features of this invention, to provide a decorative ornamental wheel cover for an outer side of the wheel which also includes in itself means for picking up and directing air into the body of the wheel as the wheel is rotated.

Accordingly, an object of this invention is to provide a simple wheel cover which includes novelly arranged air vanes for directing air into the body of the wheel.

Yet another object of this invention is to provide a combination wheel cover and vaned device which lends itself to economical manufacture on a large production scale.

In accordance with the general features of this invention there is provided, as an article of manufacture, a circular wheel cover having an outwardly projecting crown part connected to a radially outer annular part by a relatively deep portion extending generally axially and merging into the outer part, the deep portion being slotted and formed at the slots into a series of annularly arranged vanes and an inner part inside the crown part and secured to the cover and which includes a generally axially extending skirt in close proximity to the slots for diverting air picked up by the vanes axially into the body of the wheel.

A further feature of the invention relates to forming the vanes of a spiral-like arrangement so that in the rotation of the wheel they will in effect spirally direct air inwardly into the wheel body.

Another and further feature of the invention relates to forming the skirt of the cover so that it terminates in a turned portion for bottoming against a wheel when the cover is secured to the wheel.

Still another feature of the invention relates to having the skirt so formed that it is adapted for snap-on retaining engagement with spring clips on the wheel.

Other objects and features of this invention will become more apparent with the progress of the following description taken in connection with the accompanying drawings which illustrate a single embodiment thereof and in which—

Figure 1 is a fragmentary side view of a wheel with a cover of my invention, and Figure 2 is an enlarged fragmentary cross-sectional view taken on substantially the line II—II of Fig. 1 looking in the direction indicated by the arrows.

As shown on the drawings:

The reference character 9 designates generally a conventional pneumatic tube and tire assembly mounted in the usual way upon a conventional drop center type of tire rim 11 and through a flange of which projects the usual valve stem 10.

The rim 11 is mounted in the customary manner upon a wheel body or supporting member 12 which comprises a dished stamping and includes a central bolt-on flange 13 by means of which the wheel may be detachably mounted on an axle by bolts or cap screws (not shown).

The wheel body part 12 is attached at spaced intervals to the rim 11 as is well known in the art and the points of attachment alternate with wheel openings 14 extending axially of the wheel and through which air can circulate into the interior of the wheel and around the brake drum (not shown).

The central bolt-on flange 13 has secured to it a plurality of spring clips 15 which may be three to five in number and are of a well known so called goose neck type for detachably engaging a wheel cover or hubcap.

The structure thus far described is conventional and is more or less like the standard wheel now used on modern automobile wheels. My invention is particularly concerned with the provision of a wheel cover for such a wheel and I have designated my wheel cover generally by the reference character 16.

This cover includes a central crown portion 17 which is connected to a curved axially and radially outwardly extending portion 18 designed to telescope the wheel rim and curved outwardly into a beaded outer margin 19 constructed to extend over an outer turned flange of the wheel rim 11. This cover may generally be made from a metallic stamping and any suitable sheet material may be used for this purpose. Excellent results may be obtained by stamping the cover from stainless steel sheet or the like since such material lends itself to a high polish and finish.

The curved portion 18 of the cover adjacent the crown portion 17 is provided with a plurality of inwardly projecting spiral vanes 20 which are cut and pressed from the material of the cover leaving slots 20' (Fig. 1) through which air can circulate.

Positioned on the inside of the crown portion 17 is an axially projecting skirt part 21 which has a turned outer edge 22 locked between the ends of the vanes 20 and the crown portion 17. In other words the axially outer ends of the vanes 20 abut the turned edge 22 to hold it tightly against the crown portion 17.

This skirt part 21 has a curved portion 23 in close proximity to the inner edges of the vanes 20 but spaced therefrom as clearly shown in Fig. 2. The portion 23 terminates at its axially rear side in a curved nose portion 24 adapted to bottom on the nose of the body part or spider 12 and which curved portion 24 terminates in a curved annular edge 25 formed to be snapped over the resilient free ends of the spring clips 15 for detachable retained engagement with the body part 12.

The cover 16 is also provided with a hole 26 through which the valve stem 10 can project so as to be accessible from the exterior of the cover 16.

In the application of the wheel cover to the wheel the hole 26 is first aligned with the valve stem 10 and then the cover is pressed axially into the wheel which causes the turned edge 25 to snap over and behind the free resilient extremities of the clips 15 until the turned portion 24 of the skirt 21 is bottomed against the wheel body part 12 as shown in Fig. 2. In this position the outer beaded or ribbed portion 19 of the cover is spaced from the tire rim 11 so that air can pass between this edge 19 and the rim into the openings 14 of the wheel.

In addition in the rotation of the wheel the helical or spiral-like vanes 20 tend to pick up air which impinges against the curved portion 23 of the skirt 21 and is guided into the body of the wheel toward and through the wheel openings 14. In this manner this supplemental air is utilized to augment the cooling of the brake drum (not shown).

When it is desired to remove the cover it may be easily removed by inserting the edge of a pry-off tool such as a screw driver under the outer beaded edge 19 of the cover and by forcibly ejecting the cover from engagement by the spring clips 15.

It will be appreciated that by reason of the simple interlock between the turned edge 22 of the skirt 21 and the ends of the vanes 20 I am enabled to attach the skirt to the main cover 16 without having to use any supplemental fastening means such as rivets, welding or the like.

Also by reason of the configuration of the spiral or helical-like vanes 20 I am enabled to obtain a cover of a highly pleasing ornamental effect in addition to the utilitarian function of the vanes 20.

I claim as my invention:

1. As an article of manufacture, a circular wheel cover having an axially outwardly projecting crown part, a radially outer annular part connected to said crown part by a relatively deep portion extending generally axially and merging into said crown part, said deep portion being slotted and formed at said slots into a series of annularly arranged vanes and an inner part inside said crown part and secured to said cover, said inner part including a generally axially extending skirt in close proximity to the slots for directing air picked up by said vanes axially into the body of the wheel.

2. As an article of manufacture, a circular wheel cover having an axially outwardly projecting crown part, a radially outer annular part connected to said crown part by a relatively deep portion extending generally axially and merging into said crown part, said deep portion being slotted and formed at said slots into a series of annularly arranged vanes and an inner part inside said crown part and secured to said cover, said inner part including a generally axially extending skirt in close proximity to the slots for directing air picked up by said vanes axially into the body of the wheel, said skirt terminating in a turned portion for bottoming against a wheel when the cover is secured to a wheel.

3. As an article of manufacture, a circular wheel cover having an axially outwardly projecting crown part, a radially outer annular part connected to said crown part by a relatively deep portion extending generally axially and merging into said crown part, said deep portion being slotted and formed at said slots into a series of annularly arranged vanes and an inner part inside said crown part and secured to said cover, said inner part including a generally axially extending skirt in close proximity to the slots for directing air picked up by said vanes axially into the body of the wheel, said skirt terminating in a turned edge for snap-on retained engagement with spring clips on a wheel.

4. As an article of manufacture, a circular wheel cover having an axially outwardly projecting central part, a radially outer annular part connected to said central part by a relatively deep portion extending generally axially and merging into said central part, said deep portion being slotted and formed at said slots into a series of annularly arranged vanes and an inner part inside said central part and secured to said cover, said inner part including a generally axially extending skirt in close proximity to the slots for directing air picked up by said vanes axially into the body of the wheel, said skirt terminating in a turned portion for bottoming against a wheel when the cover is secured to a wheel and terminating in a turned edge for snap-on retained engagement with spring clips on a wheel.

5. As an article of manufacture, a circular wheel cover having a projecting central part, a radially outer annular part connected to said part by a relatively deep portion extending generally axially and merging into said central part, said deep portion being slotted and formed at said slots into a series of annularly arranged vanes and an inner part inside said central part and secured to said cover, said inner part including a generally axially extending skirt in close proximity to the slots for directing air picked up by said vanes axially into the body of the wheel, said vanes being generally of a spiral-like formation.

6. As an article of manufacture, a circular wheel cover having an outwardly projecting central part, a radially outer annular part connected to said central part by a relatively deep portion extending generally axially, said deep portion being slotted and formed at said slots into a series of annularly arranged vanes and an inner part inside said central part and secured to said cover, said inner part including a generally axially extending skirt in close proximity to the slots for directing air picked up by said vanes axially into the body of the wheel, said skirt having a turned outer edge locked to said central part by said vanes.

7. As an article of manufacture, a two-part wheel cover one of which parts has a circular shoulder portion and the other having air circulating vanes abutting said shoulder portion to lock said parts together, said vanes extending in a curved direction axially and radially and having their axially outermost edges abutting said shoulder portion to hold said shoulder portion in position in the cover.

8. As an article of manufacture, a two-part wheel cover, said parts having generally telescoped portions with generally axially directed shoulder structure on one of said parts and air circulating fins on the other of said parts provided with surfaces thereon directed in the opposite axial direction and interlockingly cooperating in opposing relation with said shoulder structure to retain the parts together.

9. In a wheel structure including a tire rim and a wheel body having cover retaining clips thereon, a cover for disposition at the outer side of the wheel comprising a tubular cover member having means thereon retainingly engageable in snap-on pry-off relation with said clips and extending generally axially outwardly, the axially outer end portion of said tubular cover member having a generally radially outwardly directed shoulder thereon, and a cover member dimensioned to substantially overlie the tire rim and having inwardly directed air circulation vanes struck therefrom to provide air circulation openings, said vanes having generally axially outwardly directed shoulders thereon interlockingly engaged with said shoulder on the tubular cover member.

10. In a wheel structure including a tire rim and a wheel body having cover retaining clips thereon, a cover for disposition at the outer side of the wheel comprising a tubular cover member having means thereon retainingly engageable in snap-on pry-off relation with said clips and extending generally axially outwardly, the axially outer end portion of said tubular cover member having a generally radially outwardly directed shoulder thereon, and a cover member dimensioned to substantially overlie the tire rim and having inwardly directed air circulation vanes struck therefrom to provide air circulation openings, said vanes having generally axially outwardly directed shoulders thereon interlockingly engaged with said shoulder on the tubular cover member, said cover member having the openings and vanes being supported by said tubular cover member in spaced relation to the tire rim.

References Cited in the file of this patent

UNITED STATES PATENTS

| 2,299,796 | Chase | Oct. 27, 1942 |
| 2,441,008 | Chase | May 4, 1948 |

FOREIGN PATENTS

| 787,597 | France | Sept. 25, 1935 |